(12) United States Patent
Fang et al.

(10) Patent No.: US 11,807,786 B2
(45) Date of Patent: Nov. 7, 2023

(54) QUANTUM DOT DISPERSED RESIN MOLDED BODY, QUANTUM DOT DISPERSED COLLOID, AND LIGHT EMITTING DEVICE

(71) Applicant: Najing Technology Corporation Limited, Zhejiang (CN)

(72) Inventors: Long Fang, Zhejiang (CN); Mengbing Lyu, Zhejiang (CN); Wenlong Shao, Zhejiang (CN)

(73) Assignee: Najing Technology Corporation Limited, Zhejiang (CN)

( * ) Notice: Subject to any disclaimer, the term of this patent is extended or adjusted under 35 U.S.C. 154(b) by 464 days.

(21) Appl. No.: 17/042,969

(22) PCT Filed: Apr. 29, 2019

(86) PCT No.: PCT/CN2019/085026
§ 371 (c)(1),
(2) Date: Sep. 29, 2020

(87) PCT Pub. No.: WO2019/214488
PCT Pub. Date: Nov. 14, 2019

(65) Prior Publication Data
US 2021/0054266 A1    Feb. 25, 2021

(30) Foreign Application Priority Data

May 8, 2018  (CN) .......................... 201810430259.8

(51) Int. Cl.
| | | |
|---|---|---|
| C09K 11/02 | (2006.01) | |
| C08F 220/18 | (2006.01) | |
| C08F 220/32 | (2006.01) | |
| C08F 220/40 | (2006.01) | |

(52) U.S. Cl.
CPC ...... *C09K 11/025* (2013.01); *C08F 220/1808* (2020.02); *C08F 220/1812* (2020.02); *C08F 220/325* (2020.02); *C08F 220/40* (2013.01); *C08F 2800/20* (2013.01); *C08F 2810/20* (2013.01)

(58) Field of Classification Search
CPC ........... C09K 11/025; C08F 2201/1812; C08F 2201/325; C08F 2201/1808; C08F 2201/40; C08F 2800/20; C08F 2810/20
See application file for complete search history.

(56) References Cited

U.S. PATENT DOCUMENTS

| | | | |
|---|---|---|---|
| 2013/0265522 A1* | 10/2013 | Jung | ..................... G02B 6/005 |
| | | | 428/524 |
| 2016/0291237 A1 | 10/2016 | He et al. | |
| 2017/0194530 A1 | 7/2017 | Zhou et al. | |

FOREIGN PATENT DOCUMENTS

| | | |
|---|---|---|
| CN | 102983250 A | 3/2013 |
| CN | 105629661 A | 6/2016 |
| CN | 105985672 A | 10/2016 |
| CN | 108864384 A | 11/2018 |
| JP | 2016053716 A | 4/2016 |
| WO | 2016035603 A1 | 3/2016 |
| WO | WO 2020/034795 * | 2/2020 |

\* cited by examiner

*Primary Examiner* — C Melissa Koslow
(74) *Attorney, Agent, or Firm* — Gang Yu

(57) ABSTRACT

Disclosed in the present disclosure are a quantum dot dispersed resin molded body, a quantum dot dispersed colloid, and a light emitting device. The quantum dot dispersed resin molded body includes quantum dots dispersed in an acrylate polymer, at least a portion of repeating units of the acrylate polymer comprise a C=C double bond, and the degree of polymerization n of the repeating units is greater than or equal to 2, the quantum dot dispersed resin molded body is formed by cross-linking and curing the quantum dot dispersed colloid.

14 Claims, No Drawings

QUANTUM DOT DISPERSED RESIN MOLDED BODY, QUANTUM DOT DISPERSED COLLOID, AND LIGHT EMITTING DEVICE

CROSS REFERENCE TO RELATED APPLICATIONS

This application is a national application of PCT/CN2019085026, filed on Apr. 29, 2019. The contents of PCT/CN2019085026 are all hereby incorporated by reference.

TECHNICAL FIELD

The present disclosure relates to the field of quantum dot luminescent materials, in particular to a quantum dot dispersed resin molded body, a quantum dot dispersed colloid and a light emitting device.

BACKGROUND

Quantum dots are highly unstable, especially sensitive to water and oxygen, due to the particle size of 1-10 nm, large specific surface area and a large number of unsaturated dangling bonds on the surface. Generally speaking, the failure of quantum dots mainly comes from the hydrolysis or oxidation of surface ligands. In the process of making quantum dot films, acrylic resins are mostly used as dispersion media. However, the barrier performance of acrylic resins is limited, so it is still necessary to improve the barrier performance through barrier films, but with a high cost of using barrier films to improve barrier performance which is not conducive to quantum dot film promotion. In addition, epoxy resin can be used to combine acrylate resin to improve the barrier performance. However, the addition of epoxy resin may reduce the efficiency of quantum dot on the one hand, and on the other hand, the epoxy resin tends to become yellow, resulting in the decrease of the brightness of quantum dot films.

SUMMARY

In order to overcome the shortcomings of the prior art, the first purpose of the present disclosure is to provide a quantum dot dispersed resin molded body, which has excellent oxygen barrier performance and good stability of quantum dots.

The second purpose of the present disclosure is to provide a quantum dot dispersed colloid, which is suitable for preparing a quantum dot dispersed resin molded body with excellent barrier performance.

The third purpose of the present disclosure is to provide a light emitting device including a quantum dot dispersed resin molded body with excellent barrier performance.

The first purpose of the present disclosure is achieved by the following technical scheme:

A quantum dot dispersed resin molded body includes quantum dots dispersed in an acrylate polymer, wherein the quantum dot dispersed resin molded body is formed by cross-linking and curing of a quantum dot dispersed colloid, and at least a portion of the repeating units of the acrylic polymer include a C=C double bond, and the degree of polymerization n of the repeating units is greater than or equal to 2.

The unsaturated C=C double bond in the acrylate polymer has a function of binding oxygen, which can effectively avoid the oxidation of quantum dots by oxygen, that is, the barrier performance of the quantum dot dispersed resin molded body against oxygen is improved, so that the stability of quantum dots is improved. In addition, the addition of C=C double bond does not affect the fluorescence quantum yield of quantum dots, therefore, the quantum dot dispersed resin molded body of the present disclosure improves the stability of quantum dots while not affecting the fluorescence quantum yield of quantum dots.

It is worth mentioning that the acrylate polymer is a polymer material formed by polymerization of at least one of an acrylate monomer and an acrylate prepolymer, and at the same time at least a portion of the monomers and/or prepolymers for preparing the acrylate polymer also contain at least one C=C double bond in addition to an active functional allyl group, so that the repeating units of the acrylate polymer formed by polymerization of acrylate monomers and/or acrylate prepolymers include at least one C=C double bond.

The second purpose of the present disclosure is achieved by the following technical scheme:

A quantum dot dispersed colloid includes a dispersion medium and quantum dots dispersed in the dispersion medium, wherein the dispersion medium includes: a functional acrylate resin, a non-functional acrylate prepolymer and a non-functional acrylate monomer; the functional acrylate resin is selected from at least one of a functional acrylate prepolymer and a functional acrylate monomer; the molecular chain of the functional acrylate prepolymer further includes at least one C=C double bond in addition to an active functional allyl group; the molecular structure of the functional acrylate monomer further includes at least one C=C double bond in addition to active functional allyl group.

It is worth mentioning that the non-functional acrylate prepolymer and non-functional acrylate monomer described in the present disclosure are only relative to the functional acrylate prepolymer and the functional acrylate monomer described in the present disclosure, that is, the non-functional acrylate prepolymer and the non-functional acrylate monomer contain active functional allyl groups, but no longer contain unsaturated C=C double bond in addition to the active functional allyl group, therefore, the repeating units formed by polymerization of the non-functional acrylate prepolymer and the non-functional acrylate monomer do not contain C=C double bond.

After curing, the quantum dot dispersed colloid of the present disclosure forms a quantum dot dispersed resin molded body, that is, quantum dots are dispersed in a high molecular weight polymer. Because a portion of the monomers or prepolymers forming the polymer also contain C=C double bonds in addition to the active functional allyl groups, and polymerization of the monomers or the prepolymers is through the active functional allyl groups, while the C=C double bonds are not involved in the polymerization reaction, therefore, a portion of the repeating units of the finally obtained polymer contain the C=C double bonds, which can combine with oxygen, thereby improving the oxygen barrier performance of the polymer.

Further, the non-functional acrylate monomer includes at least one of a monofunctional acrylate and a multifunctional acrylate.

The monofunctional acrylate is selected from one or more of isobornyl (meth)acrylate, methyl (meth)acrylate, ethyl (meth)acrylate, n-butyl (meth)acrylate, cyclohexyl (meth) acrylate, isooctyl (meth)acrylate, isodecyl (meth)acrylate, lauryl (meth)acrylate, 3,3,5-trimethylcyclohexyl acrylate, hydroxyethyl (meth)acrylate, hydroxypropyl (meth)acrylate, 2-phenoxyethyl (meth)acrylate, tetrahydrofurfiryl (meth)acrylate, glycidyl (meth)acrylate, acryloylmorpholine, and 2-ethylhexyl (meth)acrylate.

The multifunctional acrylate is selected from one or more of trimethylolpropane tri(meth)acrylate, ethoxylated trimethylolpropane tri(meth)acrylate, propoxylated trimethylolpropane triacrylate, 1,3-butanediol diacrylate, 1,6-hexanediol di(meth)acrylate, dipropylene glycol diacrylate, tripropylene glycol diacrylate, neopentyl glycol diacrylate, polyethylene glycol diacrylate, tricyclodecane dimethanol diacrylate, pentaerythritol triacrylate, tris(2-hydroxyethyl) isocyanurate triacrylate, pentaerythritol tetraacrylate, and dipentaerythritol hexaacrylate.

Further, the non-functional acrylate prepolymer is selected from one or more of urethane acrylate, polyester acrylate, epoxy acrylate resin, and silicone modified acrylate.

Further, the functional acrylate prepolymer is selected from one or more of unsaturated polyester modified acrylate, polybutadiene modified acrylate, and polyisoprene modified acrylate.

Further, the functional acrylate monomer is selected from one or more of dicyclopentadiene acrylate, dicyclopentadiene ethoxy acrylate, dicyclopentadiene methacrylate, and dicyclopentadiene ethoxy methacrylate.

Further, the quantum dot dispersed colloid further including one or more of the following substances dispersed in the dispersion medium: a light diffusion particle, a photoinitiator, and an antioxidant.

Further, the addition amount of the functional acrylate resin is 5%-50% of the total mass of the dispersion medium.

The third purpose of the present disclosure is achieved by the following technical scheme:

A light emitting device includes a primary light source and a quantum dot dispersed resin molded body prepared from the quantum dot dispersed colloid, and the primary light source is provided in contact with or not in contact with the quantum dot dispersed resin molded body.

Further, the shape of the quantum dot dispersed resin molded body is lamellar, or tubular, or fibrous, or lenticular, or dome-shaped.

DETAILED DESCRIPTION

It should be noted that the embodiments of the present disclosure and the features of the embodiments may be combined with each other in case of no conflict. The disclosure will be described in detail below in conjunction with the embodiments.

As used herein, the singular forms "a," "an" and "the" are intended to include the plural forms as well, unless the context clearly indicates otherwise.

In this application, the terms "(meth)acrylate" used mean acrylate and/or methacrylate.

The present disclosure provides a quantum dot dispersed resin molded body including quantum dots dispersed in an acrylate polymer. The quantum dot dispersed resin molded body is formed by cross-linking and curing of a quantum dot dispersed colloid, and at least a portion of the repeating units of the acrylic polymer include C=C double bonds, and the degree of polymerization n of the repeating units is greater than or equal to 2.

In one or more embodiments, adding a photoinitiator to the quantum dot dispersed colloid, and then placing the quantum dot dispersed colloid on a substrate, and photocuring to obtain the formed quantum dot dispersed resin molded body.

In one or more embodiments, the non-functional acrylate monomer includes at least one of a monofunctional acrylate and a multifunctional acrylate. The monofunctional acrylate is selected from one or more of isobornyl (meth)acrylate, methyl (meth)acrylate, ethyl (meth)acrylate, n-butyl (meth) acrylate, cyclohexyl (meth)acrylate, isooctyl (meth)acrylate, isodecyl (meth)acrylate, lauryl (meth)acrylate, 3,3,5-trimethylcyclohexyl acrylate, hydroxyethyl (meth)acrylate, hydroxypropyl (meth)acrylate, 2-phenoxyethyl (meth)acrylate, tetrahydrofurfuryl (meth)acrylate, glycidyl (meth)acrylate, acryloylmorpholine, and 2-ethylhexyl (meth)acrylate. The multifunctional acrylate is selected from one or more of trimethylolpropane tri(meth)acrylate, ethoxylated trimethylolpropane tri(meth)acrylate, propoxylated trimethylolpropane triacrylate, 1,3-butanediol diacrylate, 1,6-hexanediol di(meth)acrylate, dipropylene glycol diacrylate, tripropylene glycol diacrylate, neopentyl glycol diacrylate, polyethylene glycol diacrylate, tricyclodecane dimethanol diacrylate, pentaerythritol triacrylate, tris(2-hydroxyethyl) isocyanurate triacrylate, pentaerythritol tetraacrylate, and dipentaerythritol hexaacrylate.

In one or more embodiments, the non-functional acrylate prepolymer is selected from one or more of urethane acrylate, polyester acrylate, epoxy acrylate resin, and silicone modified acrylate.

In one or more embodiments, the functional acrylate prepolymer is selected from one or more of unsaturated polyester modified acrylate, polybutadiene modified acrylate, and polyisoprene modified acrylate.

In one or more embodiments, the functional acrylate monomer is selected from one or more of dicyclopentadiene acrylate, dicyclopentadiene ethoxy acrylate, dicyclopentadiene methacrylate, and dicyclopentadiene ethoxy methacrylate.

The quantum dot dispersed resin molded body can be used to prepare a light emitting device. In one or more embodiments, the shape of the quantum dot dispersed resin molded body is lamellar or tubular or fibrous or lenticular or dome-shaped when applied to a light emitting device.

Embodiment 1

The quantum dot dispersed resin molded body is prepared by the following steps:

5 parts by mass of quantum dots, 30 parts by mass of urethane acrylate, 50 parts by mass of isobornyl (meth) acrylate, 10 parts by mass of trimethylolpropane tri(meth) acrylate and 5 parts by mass of polyisoprene modified acrylate were uniformly mixed; a photoinitiator was added to the aforesaid mixture, and then the mixture was placed on a substrate for photocuring, and finally the quantum dot dispersed resin molded body of Embodiment 1 was obtained.

Embodiment 2

The quantum dot dispersed resin molded body is prepared by the following steps:

5 parts by mass of quantum dots, 30 parts by mass of polyester acrylate, 45 parts by mass of 2-ethylhexyl (meth) acrylate, and 10 parts by mass of ethoxylated trimethylolpropane tri(meth)acrylate and 10 parts by mass of polybutadiene modified acrylate were mixed uniformly; a photoinitiator was added to the aforesaid mixture, and then the mixture was placed on a substrate for photocuring, and finally the quantum dot dispersed resin molded body of Embodiment 2 was obtained.

Embodiment 3

The quantum dot dispersed resin molded body is prepared by the following steps:
5 parts by mass of quantum dots, 30 parts by mass of epoxy acrylate, 30 parts by mass of glycidyl (meth)acrylate, 5 parts by mass of pentaerythritol triacrylate, and 30 parts by mass of dicyclopentadiene methacrylate were uniformly mixed; a photoinitiator was added to the aforesaid mixture, and then the mixture was placed on a substrate for photocuring, and finally the quantum dot dispersed resin molded body of Embodiment 3 was obtained.

Embodiment 4

The quantum dot dispersed resin molded body is prepared by the following steps:
5 parts by mass of quantum dots, 30 parts by mass of silicone acrylate, 10 parts by mass of isodecyl (meth)acrylate, 5 parts by mass of tris(2-hydroxyethyl)isocyanurate triacrylate, 50 parts by mass of dicyclopentadiene ethoxy methacrylate were mixed uniformly; a photoinitiator was added to the aforesaid mixture, and then the mixture was placed on a substrate for photocuring, and finally the quantum dot dispersed resin molded body of Embodiment 4 was obtained.

Comparative Embodiment 1

The quantum dot dispersed resin molded body is prepared by the following steps:
5 parts by mass of quantum dots, 35 parts by mass of urethane acrylate, 50 parts by mass of isobornyl (meth)acrylate and 10 parts by mass of trimethylolpropane tri(meth)acrylate were uniformly mixed; a photoinitiator was added to the aforesaid mixture, and then the mixture was placed on a substrate for photocuring, and finally the quantum dot dispersed resin molded body of Comparative Embodiment 1 was obtained.

The fluorescence quantum yield and luminescence stability of the quantum dot dispersed resin molded bodies prepared in the above embodiments and comparative embodiments were tested. The detection method of fluorescence quantum yield is: with 450 nm blue LED lamp as the backlight, use the integrating sphere to test the blue backlight spectrum and the spectra through the quantum dot composite materials respectively, and use the integral area of the spectra to calculate the fluorescence quantum yield of quantum dots. Luminescence efficiency of quantum dots=(area of absorption peak of red quantum dots+area of absorption peak of green quantum dots)/(area of blue backlight peak−area of unabsorbed blue peak through quantum dot dispersed resin molded body)*100%. Luminescence stability was evaluated by the following methods: under aging conditions such as high temperature and blue light radiation (70° C., 0.5 W/cm2), high temperature and high humidity (65° C./95% RH) and high-temperature storage (85° C.), efficiency changes and sizes of inactive edge of quantum dot dispersed resin molded body were detected. The test results are shown in Table 1 and Table 2.

It can be seen from the detection results in Table 1 and Table 2 that the quantum dot dispersed resin molded body of each embodiment has better quantum dot stability.

TABLE 1

Changes in fluorescence quantum yield of each embodiment and comparative embodiment after aging

| | | Efficiency after 1,000 hours of aging | | |
|---|---|---|---|---|
| | Initial efficiency | High temperature and blue light radiation | High temperature and high humidity | High-temperature storage |
| Embodiment 1 | 100% | 92% | 83% | 85% |
| Embodiment 2 | 100% | 95% | 86% | 88% |
| Embodiment 3 | 100% | 98% | 88% | 90% |
| Embodiment 4 | 100% | 100% | 90% | 92% |
| Comparative Embodiment 1 | 100% | 90% | 75% | 80% |

TABLE 2

Changes in inactive edge of each embodiment and comparative embodiment after aging

| | | Size(mm) of inactive edge after 1,000 aging hours | | |
|---|---|---|---|---|
| | Initial inactive edge size (mm) | High temperature and blue light radiation | High temperature and high humidity | High-temperature storage |
| Embodiment 1 | 0 | 0.8 | 1.0 | 1.0 |
| Embodiment 2 | 0 | 0.6 | 0.8 | 0.8 |
| Embodiment 3 | 0 | 0.4 | 0.6 | 0.6 |
| Embodiment 4 | 0 | 0.2 | 0.4 | 0.4 |
| Comparative Embodiment 1 | 0 | 1.0 | 1.5 | 1.5 |

The foregoing descriptions are merely preferred embodiments of the present disclosure and are not intended to limit the present disclosure, and for those skilled in the art, the present disclosure may have various changes and modifications. Any modification, equivalent replacement, and improvement made in the spirit and principle of the present disclosure shall fall within the protection scope of the present disclosure.

What is claimed is:

1. A quantum dot dispersed colloid, comprising a dispersion medium and quantum dots dispersed in said dispersion medium, wherein said dispersion medium comprises: a functional acrylate resin, a non-functional acrylate prepolymer and a non-functional acrylate monomer; said functional acrylate resin is selected from at least one of a functional acrylate prepolymer and a functional acrylate monomer; a molecular chain of said functional acrylate prepolymer further comprises at least one C=C double bond in addition to an active functional allyl group; a molecular structure of said functional acrylate monomer further comprises at least one C=C double bond in addition to an active functional allyl group, said functional acrylate monomer is selected from one or more of dicyclopentadiene acrylate, dicyclopentadiene ethoxy acrylate, dicyclopentadiene methacrylate, and dicyclopentadiene ethoxy methacrylate.

2. The quantum dot dispersed colloid according to claim 1, wherein said non-functional acrylate monomer comprises at least one of a monofunctional acrylate and a multifunctional acrylate;
said monofunctional acrylate is selected from one or more of isobornyl (meth)acrylate, methyl (meth)acrylate, ethyl (meth)acrylate, n-butyl (meth)acrylate, cyclohexyl (meth)acrylate, isooctyl (meth)acrylate, isodecyl (meth)acrylate, lauryl (meth)acrylate, 3,3,5-trimethylcyclohexyl acrylate, hydroxyethyl (meth)acrylate, hydroxypropyl (meth)acrylate, 2-phenoxyethyl (meth)acrylate, tetrahydrofurfuryl (meth)acrylate, glycidyl (meth)acrylate, acryloylmorpholine, and 2-ethylhexyl (meth)acrylate;

said multifunctional acrylate is selected from one or more of trimethylolpropane tri(meth)acrylate, ethoxylated trimethylolpropane tri(meth)acrylate, propoxylated trimethylolpropane triacrylate, 1,3-butanediol diacrylate, 1,6-hexanediol di(meth)acrylate, dipropylene glycol diacrylate, tripropylene glycol diacrylate, neopentyl glycol diacrylate, polyethylene glycol diacrylate, tricyclodecane dimethanol diacrylate, pentaerythritol triacrylate, tris(2-hydroxyethyl)isocyanurate triacrylate, pentaerythritol tetraacrylate, and dipentaerythritol hexaacrylate.

3. The quantum dot dispersed colloid according to claim 1, wherein said non-functional acrylate prepolymer is selected from one or more of urethane acrylate, polyester acrylate, epoxy acrylate resin, and silicone modified acrylate.

4. The quantum dot dispersed colloid according to claim 1, wherein said functional acrylate prepolymer is selected from one or more of unsaturated polyester modified acrylate, polybutadiene modified acrylate, and polyisoprene modified acrylate.

5. The quantum dot dispersed colloid according to claim 1, wherein further comprising one or more of the following substances dispersed in said dispersion medium: a light diffusion particle, a photoinitiator, and an antioxidant.

6. The quantum dot dispersed colloid according to claim 1, wherein an addition amount of said functional acrylate resin is 5%-50% of a total mass of said dispersion medium.

7. The quantum dot dispersed colloid according to claim 2, wherein further comprising one or more of the following substances dispersed in said dispersion medium: a light diffusion particle, a photoinitiator, and an antioxidant.

8. The quantum dot dispersed colloid according to claim 3, wherein further comprising one or more of the following substances dispersed in said dispersion medium: a light diffusion particle, a photoinitiator, and an antioxidant.

9. The quantum dot dispersed colloid according to claim 4, wherein further comprising one or more of the following substances dispersed in said dispersion medium: a light diffusion particle, a photoinitiator, and an antioxidant.

10. The quantum dot dispersed colloid according to claim 2, wherein an addition amount of said functional acrylate resin is 5%-50% of a total mass of said dispersion medium.

11. The quantum dot dispersed colloid according to claim 3, wherein an addition amount of said functional acrylate resin is 5%-50% of a total mass of said dispersion medium.

12. The quantum dot dispersed colloid according to claim 4, wherein an addition amount of said functional acrylate resin is 5%-50% of a total mass of said dispersion medium.

13. A light emitting device, comprising a primary light source, wherein further comprising a quantum dot dispersed resin molded body prepared from said quantum dot dispersed colloid according to claim 1, wherein said primary light source is provided in contact with or not in contact with said quantum dot dispersed resin molded body.

14. The light emitting device according to claim 13, wherein a shape of said quantum dot dispersed resin molded body is lamellar or tubular or fibrous or lenticular or dome-shaped.

* * * * *